(12) United States Patent
Sasse et al.

(10) Patent No.: US 8,418,450 B2
(45) Date of Patent: Apr. 16, 2013

(54) HYDRODYNAMIC CLUTCH ARRANGEMENT

(75) Inventors: Christoph Sasse, Schweinfurt (DE); Georg Mencher, Grafenrheinfeld (DE); Gregor Sueck, Sennfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 835 days.

(21) Appl. No.: 12/575,874

(22) Filed: Oct. 8, 2009

(65) Prior Publication Data
US 2010/0083648 A1 Apr. 8, 2010

(30) Foreign Application Priority Data
Oct. 8, 2008 (DE) .......................... 10 2008 042 665

(51) Int. Cl.
*F16D 33/20* (2006.01)

(52) U.S. Cl.
USPC ............................................ 60/361; 60/330

(58) Field of Classification Search .................... 60/330, 60/361, 366
See application file for complete search history.

(56) References Cited

U.S. PATENT DOCUMENTS

| | | | |
|---|---|---|---|
| 4,044,556 A * | 8/1977 | Kuramochi et al. | 60/361 |
| 4,186,557 A * | 2/1980 | Arai et al. | 60/361 |
| 5,241,820 A * | 9/1993 | Fukunaga et al. | 60/330 |
| 6,959,544 B2 * | 11/2005 | Fukunaga et al. | 60/330 |
| 2004/0118112 A1 | 6/2004 | Mori | |
| 2007/0169470 A1* | 7/2007 | Fukunaga et al. | 60/345 |

FOREIGN PATENT DOCUMENTS

| | | |
|---|---|---|
| DE | 103 59 625 | 7/2004 |
| EP | 0 070 662 | 7/1982 |
| JP | 2005 308099 | 11/2005 |

* cited by examiner

*Primary Examiner* — Michael Leslie
(74) *Attorney, Agent, or Firm* — Cozen O'Connor

(57) ABSTRACT

A hydrodynamic torque converter, having a housing arrangement is filled with fluid and an impeller with a plurality of impeller vanes successively arranged in circumferential direction around an axis of rotation, a turbine in a housing interior, the turbine has a plurality of turbine vanes successively arranged in circumferential direction around the axis of rotation, and a stator with stator vanes successively arranged in circumferential direction around the axis of rotation. The impeller, the turbine and the stator form a fluid circulation torus with a torus diameter Td considered radially with respect to the axis of rotation, an outer radius Ra with respect to the axis of rotation, and a torus width considered in direction of the axis of rotation.

3 Claims, 2 Drawing Sheets

HYDRODYNAMIC CLUTCH ARRANGEMENT

BACKGROUND OF THE INVENTION

1. Field of the Invention

The present invention is directed to a hydrodynamic torque converter used in a drivetrain of a motor vehicle. A hydrodynamic torque converter of this type comprises a housing arrangement that is filled with fluid or is fillable with fluid and which has an impeller with a plurality of impeller vanes successively arranged in circumferential direction around an axis of rotation, a turbine in an interior space of the housing, which turbine has a plurality of turbine vanes successively arranged in circumferential direction around the axis of rotation, and a stator with stator vanes successively arranged in circumferential direction around the axis of rotation. The impeller, the turbine, and the stator form a fluid circulation torus with a torus diameter Td considered radially with respect to the axis of rotation, an outer radius Ra with respect to the axis of rotation, and a torus width B considered in direction of the axis of rotation.

2. Description of the Related Art

EP 0 070 662 A1 discloses a hydrodynamic torque converter for which optimal values are indicated for a variety of measurements and ratios thereof. For example, an optimal value range of 0.5 to 1 is indicated for the ratio between the width, considered or measured in direction of the axis of rotation, and the outer diameter of the torus of this known hydrodynamic torque converter. In this respect, the ratio of the radial height, that is, the radial extension of the torus, to the width, i.e., the axial length, should be in the range of 0.88 to 1, which means that the fluid circulation torus can have an approximately circular outer contour.

SUMMARY OF THE INVENTION

An object of the present invention is to provide a hydrodynamic torque converter having an optimized peak efficiency with the smallest possible radial structural dimensions.

According to one embodiment of the invention, this object is met through a hydrodynamic torque converter, comprising a housing arrangement filled with fluid or fillable with fluid and having an impeller with a plurality of impeller vanes successively arranged in circumferential direction around an axis of rotation, a turbine with a plurality of turbine vanes successively arranged in circumferential direction around the axis of rotation, and a stator with stator vanes successively arranged in circumferential direction around the axis of rotation, wherein the impeller, the turbine, and the stator form a fluid circulation torus with a torus diameter Td considered radially with respect to the axis of rotation, an outer radius Ra with respect to the axis of rotation, and a torus width B considered in direction of the axis of rotation, where:

$0.25 < Td/Ra < 0.45$ and/or $0.25 < B/Ra < 0.45$ and, further, where:

$zp > 35$, where $zp$ is the quantity of impeller vanes, and/or $zt > 31$, where $zt$ is the quantity of turbine vanes.

By selecting the turbine vanes and/or the impeller vanes in the range of values indicated above, an increase in the peak efficiency is achieved in association with the geometric ratios defined by the radial torus diameter and the axial torus with respect to the outer radius of the torus.

The fluid circulation torus is preferably constructed with a substantially circular outer contour. This can be achieved, for example, in that:

$0.8 < B/(Ra-Ri) < 1.2$, where Ri is an inner torus radius of the fluid circulation torus with respect to the axis of rotation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention will be described in more detail in the following referring to the accompanying drawings.

DETAILED DESCRIPTION OF THE PRESENTLY PREFERRED EMBODIMENTS

Figure 1:
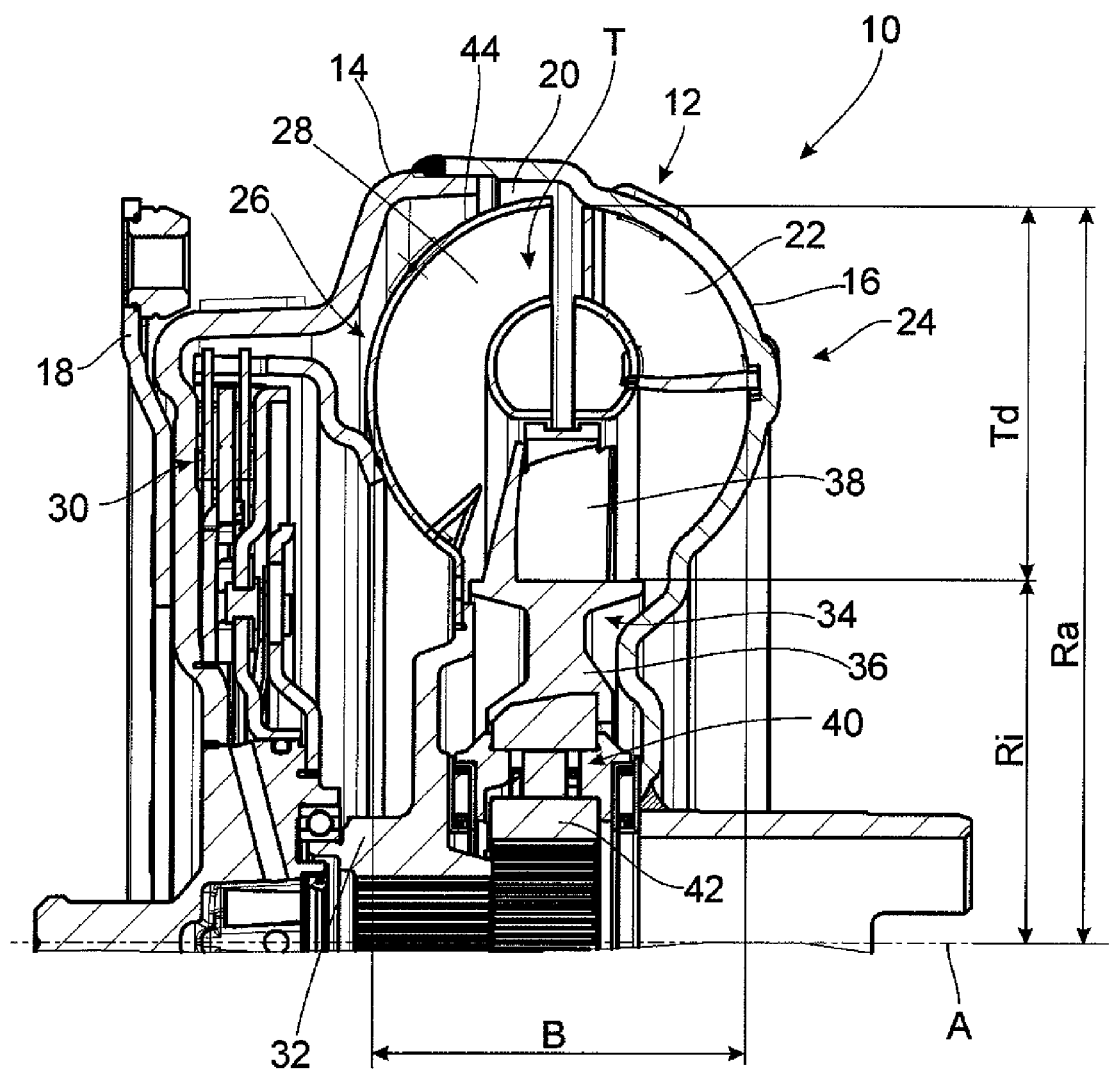
FIG. 1 is a partial longitudinal section through a hydrodynamic torque converter.

FIG. 1 shows a hydrodynamic torque converter, designated in its entirety by 10. This hydrodynamic torque converter 10 comprises a housing arrangement 12 with a housing shell 14 on the engine side and a housing shell 16 on the transmission side. The engine-side housing shell 14 is preferably coupled to a driveshaft, not shown, for example, a crankshaft of an internal combustion engine, for rotation around an axis of rotation A by a coupling assembly 18.

The transmission-side housing shell 16 has, at its side facing a housing interior 20, a plurality of impeller vanes 22 and, together with the latter, forms an impeller 24. Further, a turbine 26 is arranged in the housing interior 20, this turbine 26 having a plurality of turbine vanes 28 successively arranged in circumferential direction axially opposite to the impeller vanes. The turbine 26 can be connected to the housing arrangement 12 by a lockup clutch 30, preferably with a torsional vibration damper positioned therebetween. The turbine 26 has, as output member, a turbine hub 32 coupled to a transmission input shaft, not shown, for joint rotation around the axis of rotation A.

A stator 34 is arranged axially between the impeller 24 and the turbine 26. This stator 34 carries on a stator ring 36 a plurality of stator vanes 38 successively arranged in circumferential direction around the axis of rotation A. The stator ring 36 is supported on a supporting hollow shaft, not shown, by a freewheeling arrangement 40 and a stator hub 42 for rotating around the axis of rotation A in one rotating direction. The stator vanes 38 lie between the radial inner end area of the turbine vanes 28 on the out-flow side and the radial inner end areas of the impeller vanes 22 on the in-flow side, whose radial outer end areas on the out-flow side are located axially opposite from the radial outer end areas of the turbine vanes 28 on the in-flow side.

A fluid circulation torus, designated in its entirety by T, is defined by the turbine 26, particularly a turbine shell 44 thereof, the stator 34, particularly the stator ring 36 thereof, and the impeller 24, particularly the transmission-side housing shell 16. In the present example, this fluid circulation torus T has an axial width B considered in direction of the axis of rotation A and a torus diameter Td of the cross-section of the torus T considered in direction radial to the axis of rotation A. This corresponds substantially to the difference between an outer torus radius Ra with respect to the axis of rotation A and an inner torus radius Ri, also with respect to the axis of rotation A.

Figure 2:
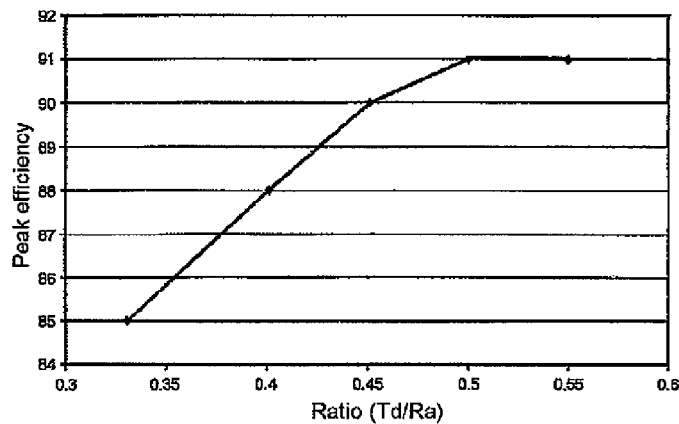
FIG. 2 is a graph showing of efficiency of a hydrodynamic torque converter plotted over the ratio of the radial torus diameter to the outer radius of the torus.

FIG. 2 is a graph of the peak efficiency of a hydrodynamic torque converter 10 of the type described above as a function of a ratio Td/Ra. It will be seen that the peak efficiency increases as the ratio increases up to a value of approximately 0.5 and then passes into a saturation range. Thus, it is possible to construct the hydrodynamic torque converter 10 such that the ratio Td/Ra is approximately 0.5 in order to reach the highest possible peak efficiency. The converter has a comparatively large outer dimensioning to realize this ratio, particularly when the fluid circulation torus T has an approximately circular outer contour, that is, when it the values Td and B are approximately equal.

Based on the principles of the present invention, a hydrodynamic torque converter 10 of this type is designed more compactly so as to accommodate the growing demand for the smallest possible installation space. This means that the ratio Td/Ra and/or the ratio B/Ra should be in a range of 0.25 to 0.45 according to the principles of the present invention. Consequently, as is illustrated in FIG. 2, operation at optimal efficiency is not achieved with respect to this ratio.

To compensate for the non-optimal efficiency, the present invention provides that the quantity of vanes of the turbine is greater than 31, that is, at least 32, and/or the quantity of impeller vanes is greater than 35, that is, at least 36. In this connection, FIG. 3 shows that the peak efficiency varies appreciably as the quantity of turbine vanes 28 and impeller vanes 22 increases.

Figure 3:
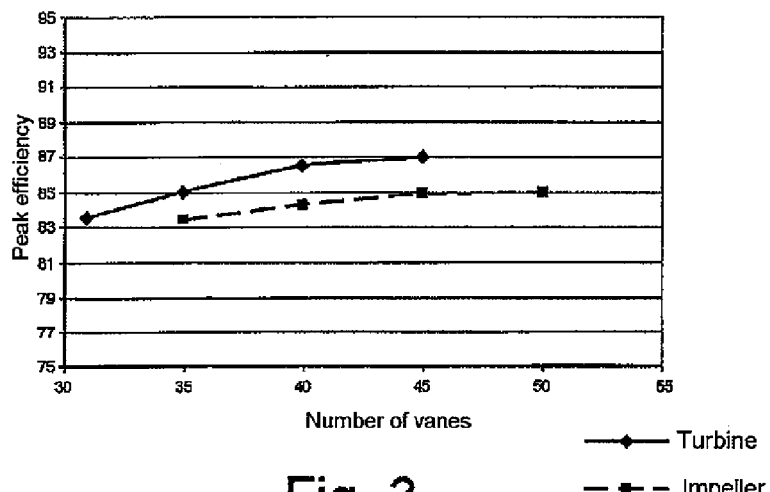
FIG. 3 is a graph illustrating efficiency plotted over the quantity of vanes of a turbine and of an impeller.

In FIG. 3, the quantity of impeller vanes 22 which was selected for determining the variation in peak efficiency by changing the quantity of turbine vanes 28 was thirty-five, while the quantity of turbine vanes 28 was set at thirty one for determining the variation as a function of the quantity of impeller vanes 22.

Accordingly, by increasing the quantity of turbine vanes 28, preferably in combination with the increase in the quantity of impeller vanes 22, an increase in the peak efficiency can be achieved, which can at least partially compensate for the reduction in peak efficiency that must be tolerated in order to economize on installation space. It has been shown that an efficiency of about 90% can be achieved with a ratio Td/Ra of approximately 0.35 with fifty impeller vanes 22 and forty-five turbine vanes 28.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hydrodynamic torque converter, comprising:
a housing configured to be filled with a fluid;
an impeller arranged in the housing, the impeller comprising a plurality of impeller vanes successively arranged in circumferential direction around an axis of rotation;
a turbine arranged in the housing, the turbine comprising a plurality of turbine vanes successively arranged in circumferential direction around the axis of rotation; and
a stator arranged in the housing, the stator comprising a plurality of stator vanes successively arranged in circumferential direction around the axis of rotation,
wherein the impeller, the turbine, and the stator form a fluid circulation torus having
a torus diameter Td of the cross-section of the torus considered radially with respect to the axis of rotation,
an outer radius Ra with respect to the axis of rotation, and
a torus width B considered in direction of the axis of rotation, wherein the hydrodynamic torque converter satisfies at least one of:

$$0.25 < Td/Ra < 0.45,$$

$$0.25 < B/Ra < 0.45,$$

$zp > 35$, where $zp$ is the quantity of the plural impeller vanes, and $zt > 31$, where $zt$ is the quantity of the plural turbine vanes, wherein:

$$0.8 < B/(Ra-Ri) < 1.2,$$

where Ri is an inner torus radius of the fluid circulation torus with respect to the axis of rotation.

2. A hydrodynamic torque converter, comprising:
a housing configured to be filled with a fluid;
an impeller arranged in the housing, the impeller comprising a plurality of impeller vanes successively arranged in circumferential direction around an axis of rotation;
a turbine arranged in the housing, the turbine comprising a plurality of turbine vanes successively arranged in circumferential direction around the axis of rotation; and
a stator arranged in the housing, the stator comprising a plurality of stator vanes successively arranged in circumferential direction around the axis of rotation,
wherein the impeller, the turbine, and the stator form a fluid circulation torus that has a substantially circular outer contour having
a torus diameter Td of the cross-section of the torus considered radially with respect to the axis of rotation,
an outer radius Ra with respect to the axis of rotation, and
a torus width B considered in direction of the axis of rotation, wherein the hydrodynamic torque converter satisfies at least one of:

$0.25 < Td/Ra < 0.45$, $0.25 < B/Ra < 0.45$, $zp > 35$, where $zp$ is the quantity of the plural impeller vanes, and $zt > 31$, where $zt$ is the quantity of the plural turbine vanes, wherein:

$0.8 < B/(Ra-Ri) < 1.2$, where Ri is an inner torus radius of the fluid circulation torus with respect to the axis of rotation.

3. A hydrodynamic torque converter, comprising:
a housing configured to be filled with a fluid;
an impeller arranged in the housing, the impeller comprising a plurality of impeller vanes successively arranged in circumferential direction around an axis of rotation;
a turbine arranged in the housing, the turbine comprising a plurality of turbine vanes successively arranged in circumferential direction around the axis of rotation; and
a stator arranged in the housing, the stator comprising a plurality of stator vanes successively arranged in circumferential direction around the axis of rotation,
wherein the impeller, the turbine, and the stator form a fluid circulation torus that has a substantially circular outer contour having
a torus diameter Td of the cross-section of the torus considered radially with respect to the axis of rotation,
an outer radius Ra with respect to the axis of rotation, and
a torus width B considered in direction of the axis of rotation, wherein the hydrodynamic torque converter satisfies at least one of:

$0.25 < Td/Ra < 0.45$, $0.25 < B/Ra < 0.45$, $zp > 35$, where $zp$ is the quantity of the plural impeller vanes, and $zt > 31$, where $zt$ is the quantity of the plural turbine vanes, wherein $Td/Ra = 0.35$, $Zp = 50$, and $Zt = 45$.

* * * * *